(12) United States Patent
Laserson

(10) Patent No.: US 11,074,619 B2
(45) Date of Patent: Jul. 27, 2021

(54) DATA-DRIVEN MACHINE-LEARNING TARGETED ENGAGEMENT

(71) Applicant: NCR Corporation, Atlanta, GA (US)

(72) Inventor: Itamar David Laserson, Givat Shmuel (IL)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/586,163

(22) Filed: Sep. 27, 2019

(65) Prior Publication Data

US 2021/0097577 A1   Apr. 1, 2021

(51) Int. Cl.
*G06Q 30/02* (2012.01)
*G06N 5/04* (2006.01)
*G06N 20/00* (2019.01)

(52) U.S. Cl.
CPC ........... *G06Q 30/0268* (2013.01); *G06N 5/04* (2013.01); *G06N 20/00* (2019.01)

(58) Field of Classification Search
CPC ....... G06Q 30/0268; G06N 5/04; G06N 20/00
USPC ...................................................... 705/14.65
See application file for complete search history.

(56) References Cited

FOREIGN PATENT DOCUMENTS

JP    2011121577 A   *   6/2011   ............ B60W 50/10

OTHER PUBLICATIONS

Chloe Mawer, Data-Driven User Engagement, 2017 (Year: 2017).*
Charles Duhigg, How Companies Learn Your Secrets, 2012 (Year: 2012).*

* cited by examiner

*Primary Examiner* — Tarek Elchanti
(74) *Attorney, Agent, or Firm* — Schwegman, Lundberg & Woessner

(57) ABSTRACT

A machine-learning algorithm is trained with features relevant to a visual/video analysis performed on subjects conducting transaction at transaction terminals. The algorithm is also trained on weather data known at the time of the transactions and on selective details of the transactions. The algorithm produces as output predictions relevant to: whether a given subject for a current transaction is likely to enter a store, likely items that the given subject might purchase if the subject were to enter the store and likely amount of money that the subject would spend in the store, an effectiveness of providing an incentive for the subject to enter the store, and what type of incentive would most likely entice the subject to enter the store.

7 Claims, 4 Drawing Sheets

DATA-DRIVEN MACHINE-LEARNING TARGETED ENGAGEMENT

BACKGROUND

Some estimates indicate that approximately 75% of consumers purchasing fuel never enter the convenience store associated with the fuel pumps. If just 10% of this 75% were to actually enter the store, estimates indicate that store revenues would increase by approximately 30%.

Retailers currently try and attract fuel-purchasing consumers into the store through a variety of methods, none of which have been very effective. Such methods include signage, blasting offers/video over fuel monitors where the same advertisement is playing on each of the fuel pumps without regard to each of the individual consumers, and displaying text offers on the pump to the consumer during the fuel transactions. The text offers are an annoyance to most consumers because these ads delay initiation of the fuel pump and/or delay final payment. Moreover, some of the interfaces on the pumps are extremely slow. None of these methods have proven to be effective for the retailers.

Attempts at targeting advertisements to specific consumers has also proven to be ineffective because most fuel retailers lack any significant data store on their consumers; that is, the vast majority of the fuel consumers are passing through an area associated with the store and are not loyalty members of the gas stations/fuel retailers.

Moreover, blasting offers/video results in providing discounts on items to consumers who were already planning on entering the store in the first place (i.e., they were already part of the 25% that enter the store). Consequently, and in some instances, the blast offers are causing retailers to lose revenue that was expected during the normal course of business.

As a result, attracting consumers into the fuel store when the consumers are purchasing fuel at the fuel pumps has remained an elusive goal for the fuel retailers.

SUMMARY

In various embodiments, methods and a system for data-driven machine-learning targeted engagement are presented.

According to an aspect, a method for data-driven machine-learning targeted engagement is presented. Specifically, visual characteristics of a transaction area are derived as first features during a transaction at a transaction terminal. Current transaction details are obtained for the transaction as second features. A determination is made as to whether to actively engage a customer at the transaction terminal and a type of engagement for engaging the customer based on the first features and the second features.

DETAILED DESCRIPTION

Figure 1:
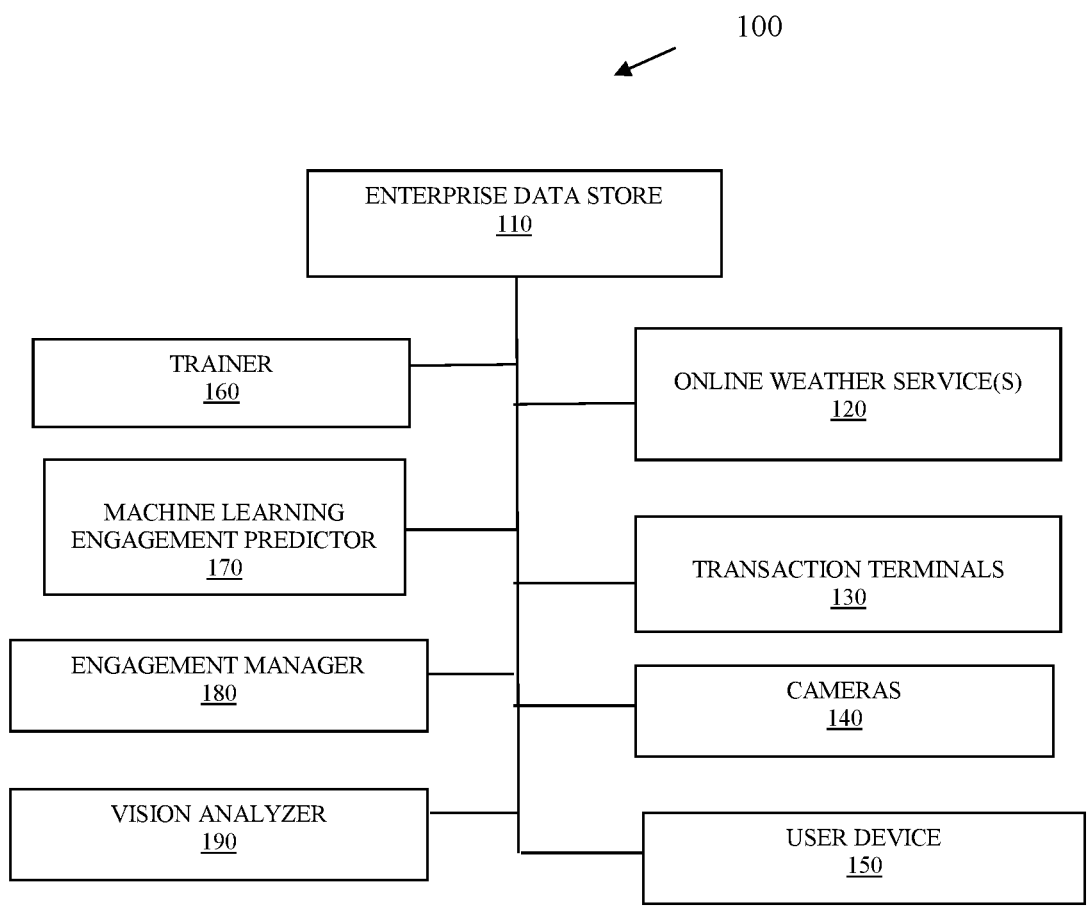
FIG. 1 is a diagram of a system for data-driven machine-learning targeted engagement, according to an example embodiment.

FIG. 1 is a diagram of a system 100 for data-driven machine-learning targeted engagement, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of data-driven machine-learning targeted engagement presented herein and below.

The system 100 provides a mechanism by which a machine-learning algorithm can be trained with at least three types of features: customer characteristics as determined through vision/video analysis, weather data at a location where the customer is conducting a transaction, and current transaction details associated with the transaction the customer is conducting. Observed results associated with whether any given transaction that resulted in a customer entering a store and/or making an in-store purchase are provided as expected output to the machine-learning for each set of features (visual characteristics, weather data, and selective transaction details. The trained machine-learning algorithm can then accept live visual characteristics, weather data, and selective transaction details for a given customer during a given transaction and provide output values representing a percentage or confidence that the customer is or is not going to enter the store, if the customer were to enter the store what items would the customer likely buy and what amount of money would the customer spend, how effective would a promotion or an incentive be in attracting the customer into the store, and what type of incentive or promotion is most likely to be the most effective in bringing the customer into the store.

The system 100 includes, an enterprise data store 110, a network-based weather services 120, a plurality of transaction terminals 130, cameras 140, user devices 150, a machine-learning trainer 160, a machine-learning engagement predictor (herein after just "predictor") 170, an engagement manager 180, and a vision analyzer 190.

The trainer 160, the predictor 170, the engagement manager 180, and the vison analyzer 190 are executable instructions that reside in a non-transitory computer-readable storage medium. The executable instructions are executed by one or more hardware processors of computing devices. This causes the processed to perform the processing discussed herein and below for 160-190.

The online weather service 120 is a web-based and accessible service that provides up-to-date weather information for a given zip code or geographical area. The online weather service 120 is accessible via an Application Programming Interface (API) permitting real-time weather data to be returned to the engagement manager 180. Such real-time weather data can include, outside temperature, humidity, precipitation, wind speed, barometric pressure, weather forecast, and the like.

Transaction terminals 130 comprise a plurality of hardware devices that execute software as services provided throughout an enterprise over one or more networks (wired, wireless, or a combination of wired and wireless). Moreover, terminals 130 include a variety of integrated peripheral devices, such as and by way of example only, card readers (contact based or contactless), touchscreen display, keypad, receipt printer.

Terminals 130 include a peripheral module that controls a fuel pump and at an enterprise associated with a convenience store where gas is sold outside at the terminals 130 and other items are sold inside a store on the premises as convenience items to customers refueling their vehicles.

Cameras 150 may be integrated into terminals 130 as peripheral device or may be network-based cameras 150 that provided images for video frames over a network. In an embodiment, the images are streamed to a network storage location accessible to vision analyzer 190. This can be through the enterprise data store 110 or a local server location that is local to the convenience store. Such that as images are captured, such images are acquired from the local network storage for analysis by vision analyzer 190.

Enterprise data store 110 includes a variety of information accessible to engagement manager, such as incentives available, customer data for known customers, transaction details for transactions of customers, and other information captured and retained by the enterprise for the store and other stores associated with the enterprise.

Trainer 160 is processed during training sessions of predictor 170. During a training session as set of visual characteristics of a customer conducting a transaction at a terminal 130 are analyzed from the images provided by cameras 140. Terminal 130 provides a transaction identifier to uniquely identify the transaction. Engagement manager 180 obtains the current transaction identifier for the transaction and uses an API to obtain current weather data from weather services 120. Engagement manager 180 also obtains known transaction details from the existing transaction, such as fuel grade selection made by the customer, total volume of fuel purchased, fuel time required for fueling, any offer or incentive provided during the transaction, whether the offer or incentive was accepted or ignored, total transaction price, time of day for the transaction, day of week, calendar date, and month of year. Engagement manager 180 then uses visual characteristics to determine if the customer entered the store following the transaction, data available from enterprise data store indicates whether any sale was made of an item if the customer entered the store, what the customer purchased in the store, and a total price paid within the store by the customer. This information is used as a known outcome for the customer. The trainer 160 uses the features (weather, visual characteristics, and transaction details) for each transaction along with known outcomes (did or did not enter the store, did enter store and purchased specific items at a specific price, did or did not use an incentive provided by the terminal 130 during the fuel transaction) provided by engagement manager 180 to trail the predictor 170.

During training predictor 170 uses the features (weather, visual characteristics, and transaction details) to derive an algorithm that when provided these features produces the known outcomes (as provided by the engagement manager 180). After a sufficient number of transactions are processed in this manner and used to train predictor 170. The predictor is ready to make predicted outcomes. These predicted outcomes include: a first value indicating whether the given customer is going to enter the store or not, a second value or set of values indicating items (by item identifier or item category types) that the customer is likely to purchase if the customer were to go in the store, a third value representing a probability that a promotion or incentive provided to the customer at terminal 130 would cause the customer to come into the store, and a fourth value representing a type of promotion or incentive that would be most effective with this customer.

Engagement manager 180 interacts with terminal 130, vision analyzer 190, and weather service 120 at a start of a transaction and provides the vision characteristics produced by analyzer 190, weather data provided by service 120, and transaction details provided by terminal 130 as input to predictor 170. Predictor 170 produces the 4 output predicted outcomes. Based on this, engagement manager 180 uses rules to determine whether manager 180 should send an incentive to terminal 130 at the end of the transaction or during the transaction for presentation to the customer for purposes of attempting to entice the customer into the store. One rule enforced by manager 180 may be to not send any incentive to terminal 130 when the predicted outcome provided by predictor 170 indicates the customer is going to enter the store anyway. In such a case, there is no reason for the retailer to discount prices on store items when the customer is going to buy something anyway and has something specific in mind.

Vision analyzer 190 obtains images from cameras 140 as the images are captured of the customer during the transaction (such as through a local storage where the cameras 140 are streaming the images). Image processing techniques are used on the pixels of the images to identify the visual characteristics provided as one of three input features to the predictor. The visual characteristics are identified as values representing: a person, identify a face of the person, identify a car being driven by the person, identify clothing of the person, identify a total number of persons present in the car, estimate the age of the person, identify a gender of the person, any children present in the car, presence of any baby seat discernable from the pixels associated with the car, car type (truck, station wagon, sports car, family car, convertible, etc.), color of the car, is the car carrying or pulling anything (such as a trailer, a luggage/sports rack, bike, sports equipment, on the car), and a sentiment of the person from the facial pixel images being tracked (happy, sad, in a rush, etc.).

For example, based on the model training by the trainer 160, the predictor 170 can predict that a woman aged 35 driving alone, in a large family car, containing a baby sit, during daylight hours, in cold temperatures will have a medium probability to buy fruit and vegetables at the store after fueling. Predictor 170, based on this type of customers, may recommend a promotion of: "buy baby formula over $100, get a $10 fruit basket for free." For a different type of customer (determined from the visual characteristics), the predictor 170 may recommend not to produce a promotion at all because the customer is predicted to walk into the store anyway.

Results/outcomes for customer transactions are fed back into the predictor 170 during training sessions with the trainer 160, such that the accuracy of the predictor 170 is continuously improving and adjusting the underlying developed model/algorithm of the predictor 170.

Engagement manager 180 can deliver any promotions or incentives dictated by predicted outcomes from predictor 170 in a variety of manners, such as through the user-facing interface of terminal 130, or through directly delivery to a customer's user device 150 (via text or mobile application). In cases, where delivery is made to the user device 150, enterprise data 110 has and can identify the customer based on the transaction details (such as through entry of a loyalty number or payment card by customer during the transaction) and a registered mobile device or mobile application is known for the customer.

In an embodiment, the delivery of the promotion is handled by a separate marketing-based service that interacts with engagement manager 180.

The system 100 is data drive based on at least visual characteristics observed for a customer during a transaction. The system does not rely on deep knowledge known for a specific customer by the enterprise; rather, identity of the customer is not required, and only selective and generic transaction details are used (as discussed above). As such, the anonymity of customers are maintained and no data that identifies the identities of the customers are retained. Even without such specific and unique customer identity information and transaction history of a given customer, the system 100 provides a targeted engagement to the customer in real time, which is far more effective than even existing targeted approaches that attempt to use specific customer identity information and transaction history.

In an embodiment, the user device is a phone, a tablet, and a wearable processing device.

In an embodiment, trainer 160, predictor 170, engagement manager 180, and vision analyzer 190 are provided through a cloud processing environment that is connected over a network to transaction terminal 130 and enterprise data store 110.

In an embodiment, modules 160-190 are provided as Software-as-a-Service (SaaS) to a given enterprise on a subscription basis.

In an embodiment, the transaction terminals 130 include: a Point-Of-Sale (POS) terminal, a Self-Service Terminal (SST) and/or a kiosk.

In an embodiment, the user devices 140 include: a phone, a tablet, a laptop, and/or a wearable processing device.

In an embodiment, the transaction terminal 130 includes a fuel pump.

These and other embodiments are now discussed with reference to the FIGS. 2-4.

Figure 2:
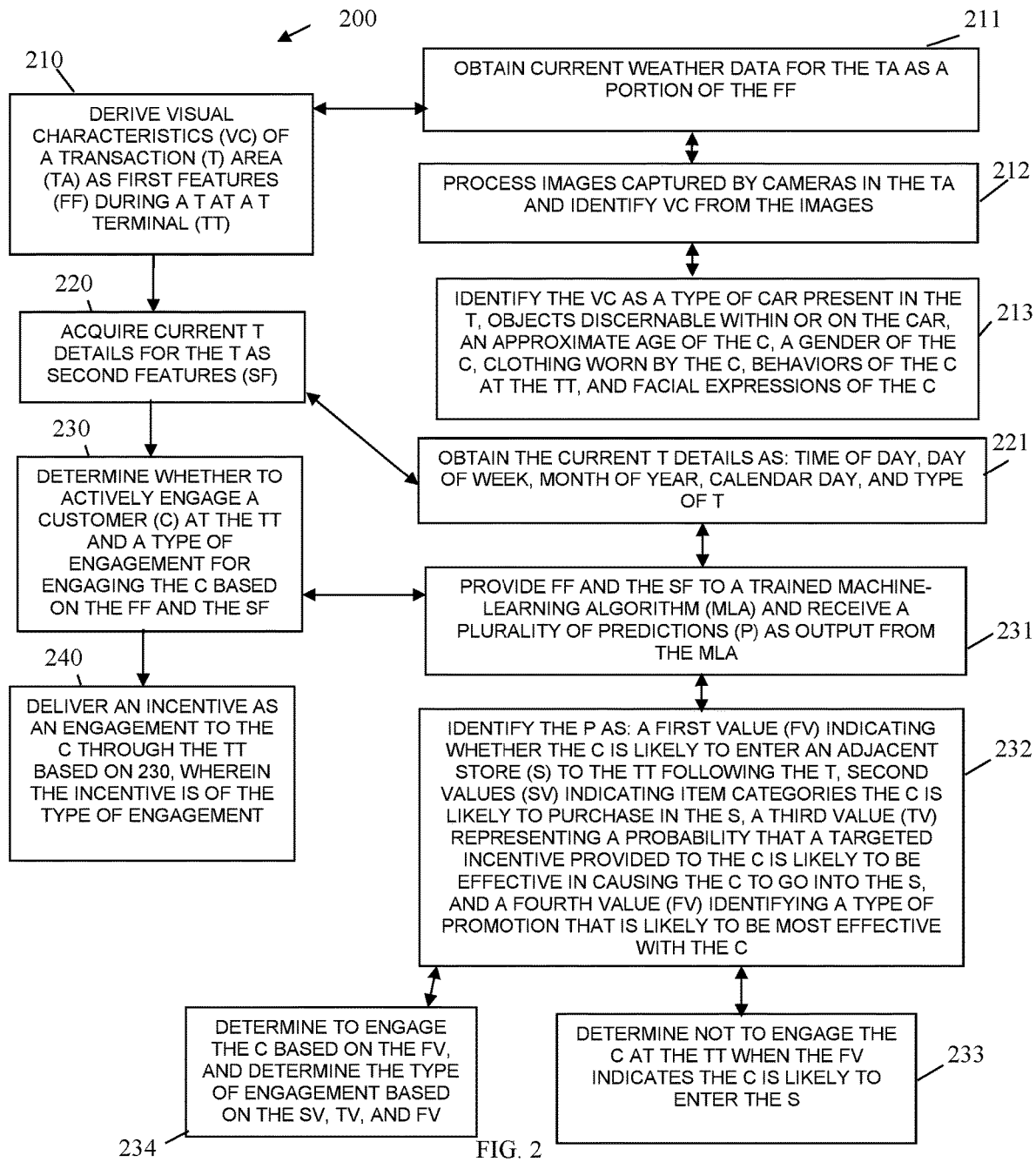
FIG. 2 is a diagram of a method for data-driven machine-learning targeted engagement, according to an example embodiment.

FIG. 2 is a diagram of a method 200 for data-driven machine-learning targeted engagement, according to an example embodiment. The software module(s) that implements the method 200 is referred to as a "engagement manager." The engagement manager is implemented as executable instructions programmed and residing within memory and/or a non-transitory computer-readable (processor-readable) storage medium and executed by one or more processors of a device. The processor(s) of the device that executes the engagement manager are specifically configured and programmed to process the engagement manager. The engagement manager has access to one or more network connections during its processing. The network connections can be wired, wireless, or a combination of wired and wireless.

In an embodiment, the device that executes the engagement manager is a server. In an embodiment, the server is a cloud processing environment that comprises multiple servers cooperating with one another as a single server. In an embodiment, the server is a Local Area Network (LAN) server.

In an embodiment, the device that executes the engagement manager is a network-edge device that is local or on an edge of a LAN of a retail store.

In an embodiment, the engagement manager is all of or some combination of: 160-190.

In an embodiment, the engagement manager is provided as a SaaS to a plurality of enterprises, each enterprise having a subscription relevant to its customers and its provided transaction and customer data.

At 210, the engagement manager derives visual characteristics of a transaction area as first features during a transaction as a transaction terminal. The transaction area is an area in front of and proximate to the transaction area.

In an embodiment, at 211, the engagement manager obtains current weather data for the transaction area as a portion of the first features. That is, visual characteristics are augmented with current weather data as discussed above with the FIG. 1.

In an embodiment of 211 and at 212, the engagement manager process images captured by camera in the transaction area and identifies the visual characteristics from the images.

In an embodiment of 212 and at 213, the engagement manager identifies the visual characteristics as: a type of car present in the transaction area, objects discernable within or on the car, an approximate age of the customer, a gender of the customer, clothing worn by the customer, behaviors of the customer at the transaction terminal, persons presented with the customer or within the customer's car, and expressions of the customer. Moreover, the visual characteristics can be any of those discussed above with the FIG. 1.

At 220, the engagement manager acquires current transaction details for the transaction as second features.

In an embodiment, at 221, the engagement manager obtains the current transaction details as: time of day for the transaction, day of week for the transaction, month of year for the transaction, calendar day for the transaction, and a type of transaction associated with the transaction.

In an embodiment, the type of transaction is a fuel pump transaction and the transaction terminal includes a fuel pump that the transaction terminal activates and deactivates.

At 230, the engagement manager determines whether to actively engage a customer at the transaction terminal and a type of engagement for any engagement of the customer based on the first features and the second features.

In an embodiment of 221 and 230, at 231, the engagement manager provide the first features and the second features to a trained machine-learning algorithm and receive a plurality of predictions as output from the machine-learning algorithm. In an embodiment, the machine-learning algorithm is the predictor 170.

In an embodiment of 231 and at 232, the engagement manager identifies the predictions as: a first value indicating whether the customer is likely or not likely to enter an adjacent store to the transaction terminal following the transaction, second values indicating item categories the customer is likely to purchase if the customer were to enter the store, a third value representing a probability that a targeted incentive provided to the customer is likely to be effective in causing the customer to go into the store from the transaction terminal; and a fourth value identifying a type of promotion that is likely to be most effective and be redeemed by the customer.

In an embodiment of 232 and at 233, the engagement manager determines to not engage the customer at the transaction terminal when the first value indicates that the customer is likely to leave the transaction terminal and enter the store following the transaction.

In an embodiment of 232 and at 234, the engagement manager determine to engage the customer based on the first value and determine the type of engagement based on the second value, the third value, and the fourth value.

In an embodiment, at 240, the engagement manager determines an incentive as an engagement to the customer through the transaction terminal based on 230. The incentive is of the type of engagement provided at 230.

Figure 3:
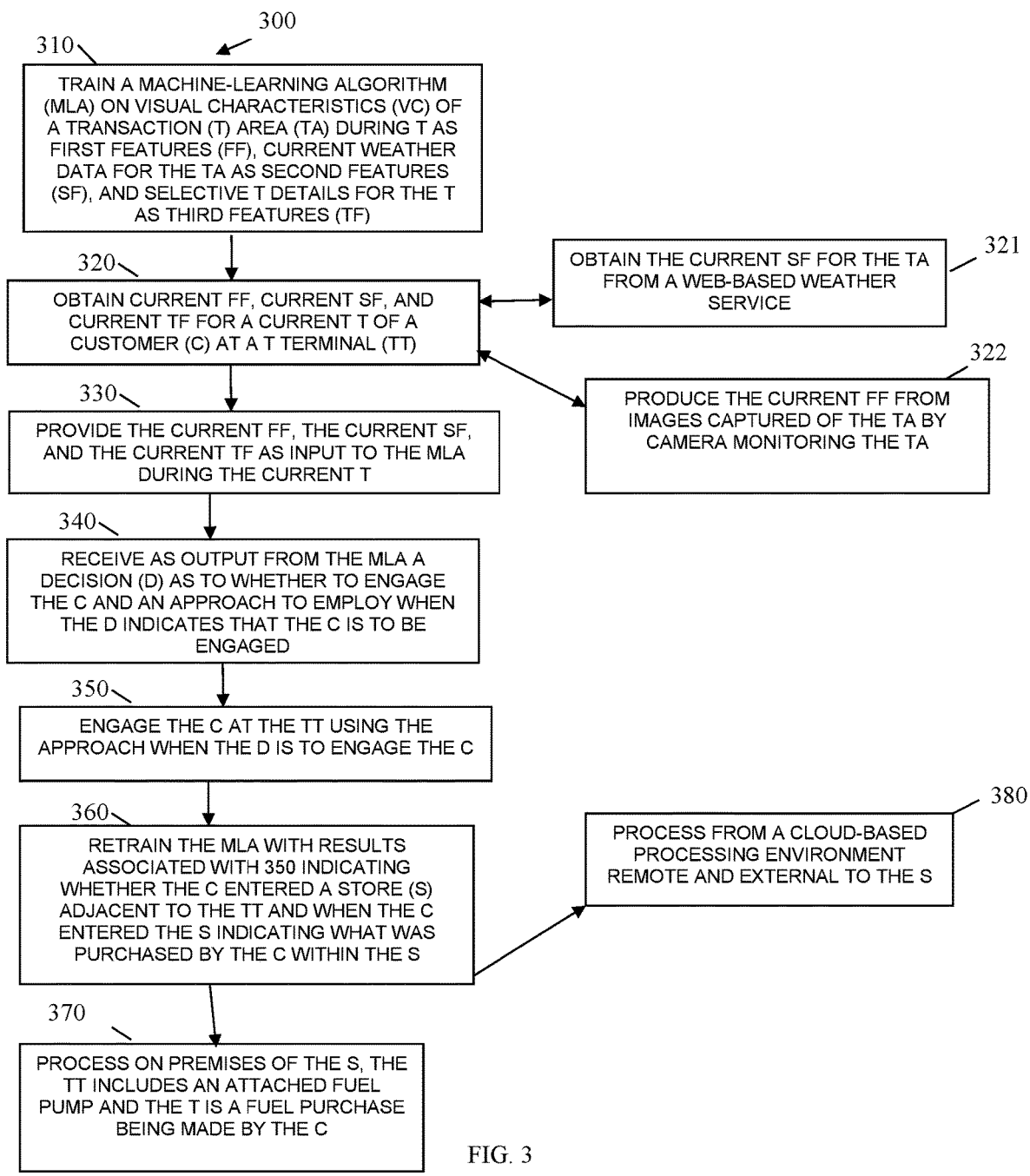
FIG. 3 is a diagram of another method data-driven machine-learning targeted engagement, according to an example embodiment.

FIG. 3 is a diagram of another method 300 for data-driven machine-learning targeted engagement, according to an example embodiment. The software module(s) that implements the method 300 is referred to as an "engagement predictor." The engagement predictor is implemented as executable instructions programmed and residing within memory and/or a non-transitory computer-readable (processor-readable) storage medium and executed by one or more processors of a device. The processors that execute the engagement predictor are specifically configured and programmed to process the engagement predictor. The engagement predictor has access to one or more network connections during its processing. The network connections can be wired, wireless, or a combination of wired and wireless.

In an embodiment, the device that executes the engagement predictor is a server. In an embodiment, the server is a cloud processing environment that comprises multiple servers cooperating with one another as a single server. In an embodiment, the server is a LAN server that is local to a retail store.

In an embodiment, the device that executes the engagement predictor is a network-edge device that is on the edge of a LAN for a retail store.

In an embodiment, the engagement predictor is all or some combination of: 160, 170, 180, 190, and/or the method 200.

The engagement predictor presents another and, in some ways, enhanced processing perspective to that which was described above with the FIG. 2.

At 310, the engagement predictor trains a machine-learning algorithm on visual characteristics of a transaction area during transactions as first features, current weather data for the transaction area as second features, and selective transaction details as third features. Outcomes expected as output from the machine-learning algorithm for the first, second, and third inputted features. In an embodiment, the machine-learning algorithm is the predictor 170.

At 320, the engagement predictor obtains current first features, current second features, and current third features for a current transaction of a customer at a transaction terminal associate with the transaction area.

In an embodiment, at 321, the engagement predictor obtains the current second features for the transaction area from a web-based weather service using an API to the service.

In an embodiment, at 322, the engagement predictor produces the current first features from images captured of the transaction area by one or more cameras monitoring the transaction area.

At 330, the engagement predictor provides the current first features, the current second features, and the current third features as input to the machine-learning algorithm during the current transaction.

At 340, the engagement predictor receives as output from the machine-learning algorithm a decision as to whether to engage the customer and a specific targeted approach (type of incentive and item category associated with the type of incentive) to employ when the decision indicates that the customer is to be engaged.

At 350, the engagement predictor engage the customer at the transaction terminal using the approach when the decision is to engage the customer.

In an embodiment, at 360, the engagement predictor retrains the machine-learning algorithm with results associated with 350 indicating whether the customer entered a store adjacent to the transaction terminal and when the customer did enter the store indicating what was purchased by the customer, if anything, within the store.

In an embodiment, at 370, the engagement predictor is processed on devices that are on the premises of the store. The transaction terminal includes an attached fuel pump and the transaction is fuel purchase being made by the customer.

In an embodiment, at 380, the engagement predictor is processed on devices that are on a cloud-processing environment remote and external to the store.

Figure 4:
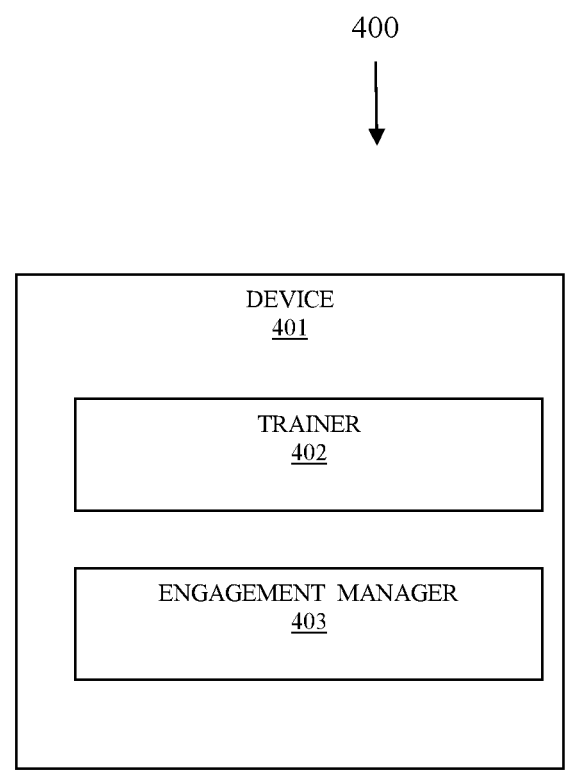
FIG. 4 is a diagram of another system for data-driven machine-learning targeted engagement, according to an example embodiment.

FIG. 4 is a diagram of a system 400 for data-driven machine-learning targeted engagement, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a processing device 401, a trainer 402, and an engagement manager 403.

In an embodiment, the processing device 401 is a server. In an embodiment, the server is a collection of servers that cooperate as a cloud processing environment.

In an embodiment, the processing device 401 is a network edge device.

The trainer 402 is a set of executable instructions that is executed on one or more hardware processors of the processing device 401 from a non-transitory computer-readable storage medium or memory.

The engagement manager 403 is also a set of executable instructions that is executed on one more hardware processors of the processing device 401 from a non-transitory computer-readable storage medium or memory.

The trainer 402, when executed by the processor(s) of the device 401, is configured to cause the processor to: 1). obtain first features, second features, third features, and outcomes for transactions that occurred at fuel pump transaction terminals adjacent to a store; and 2) train a first portion of the engagement manager with the first features, the second features, and the third features as input to the first portion and the outcomes as expected output from the first portion.

The trainer 402 trains the first portion of the engagement 403 to decide when an engagement and what type of engagement should be made to a customer conducting a transaction at a transaction terminal.

The first portion of the engagement manager 403 is a machine-learning algorithm that derives an algorithm from input features provided as visual characteristics of a customer during the transaction, weather data, and selective transaction data. Outputs generated by the first portion represent expected outcomes.

In an embodiment, the trainer 402 is the trainer 160.

The engagement manager 403, when executed by the processor(s) of the device 401, is configured to cause the processor to 1) obtain current first features, current second features, and current third features for a current transaction at a given fuel pump transaction terminal; 2) provide the current first features, the current second features, and the current third features as input to the first portion; 3) receive current outcomes produced as output by the first portion; and 4) engage a current customer associated with the current transaction with a targeted incentive to enter the store based on the current outcomes.

In an embodiment, the engagement manager 403, when executed by the processor(s) of the device 401, is further configured to cause the processor to: 5) provide actual outcomes associated with the current transaction and the targeted incentive with respect to the current first features, the current second features, and the current third features to the trainer when the actual outcomes deviate from the current outcomes for retraining the first portion.

In an embodiment, the device 401 is a cloud-based device that provides a user-facing interface to a user over a network to configure the trainer 402 and the engagement manager 403 for transactions at a given convenience store having transaction terminals that include fuel pumps for purposes of determining when and how to best engage the customers during the transactions.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    providing executable instructions to a processor of a server from a non-transitory computer-readable storage medium causing the processor to perform operations comprising:
        training a machine-learning algorithm on 1) visual characteristics of images captured of a transaction area that is in front of and is proximate to a transaction terminal during transactions as first features, 2) weather data associated with each transaction for a location associated with the transaction area as second features, 3) transaction details for the transactions as third features, and 4) known outcomes associated with the transactions indicating whether original customers associated with the transactions did or did not enter a store, did enter a store and made purchases of specific items at specific prices, and did or did not use incentives provided by the transaction with any of the purchases, wherein training further includes obtaining the weather data for each transaction from network-based weather service based on the location of the transaction terminal and dates of each transaction, wherein training further includes obtaining the transaction details as information captured by an enterprise associated with the transaction terminal and retained by the enterprise for the transactions;
        obtaining current first features, current second features, and current third features for a current transaction of a customer at the transaction terminal;
        providing the current first features, the current second features, and the current third features as input to the machine-learning algorithm during the current transaction;
        receiving as output from the machine-learning algorithm a decision as to whether to engage the customer and an approach to employ when the decision indicates that the customer is to be engaged; and
        engaging the customer at the transaction terminal and through the transaction terminal by providing a promotion to the customer using the approach when the decision is to engage the customer.

2. The method of claim 1 further comprising, retraining the trained machine-learning algorithm with results associated with the engaging indicating whether the customer entered a store adjacent to the transaction terminal and when the customer entered the store indicating what was purchased by the customer within the store.

3. The method of claim 1 further comprising, processing the method on premises of the store, wherein the transaction terminal includes an attached fuel pump and the transaction is a fuel purchase being made by the customer.

4. The method of claim 1 further comprising, processing the method from a cloud-based processing environment remote and external to the store.

5. The method of claim 1 further comprising, generating a report associated with the cashier that includes the flagged transaction and additional flagged transactions for the cashier when a total number of flagged transactions exceeds a configured amount within a given period of time.

6. The method of claim 1, wherein obtaining further includes obtaining the current second features for the transaction area from the network-based weather service.

7. The method of claim 1, wherein obtaining further includes producing the current first features from the images captured of the transaction area by cameras monitoring the transaction area.

* * * * *